No. 644,317. Patented Feb. 27, 1900.
W. T. M. BRUNNEMER.
AGRICULTURAL IMPLEMENT.
(Application filed May 6, 1899.)
(No Model.) 2 Sheets—Sheet 1.
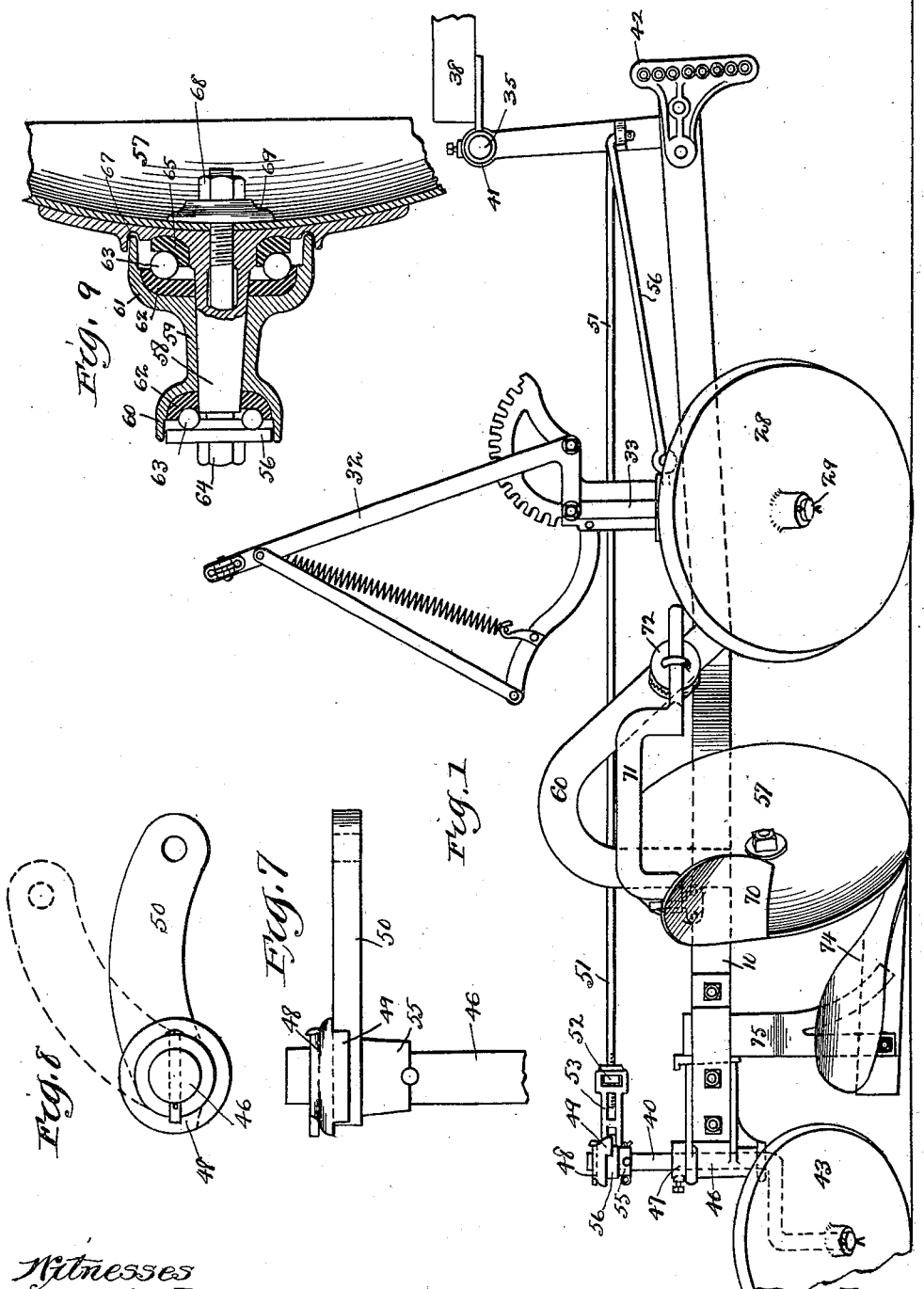

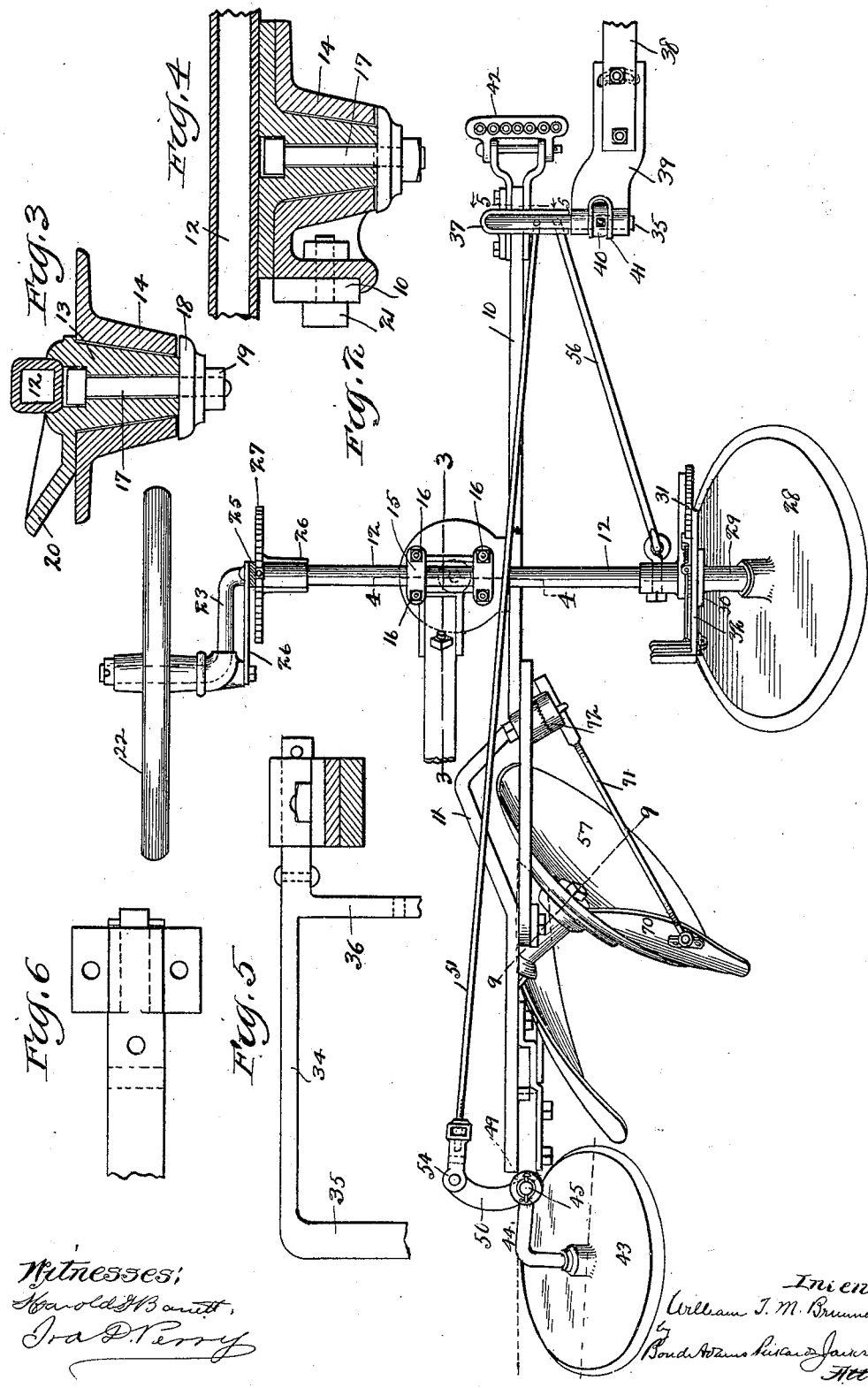

UNITED STATES PATENT OFFICE.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS.

AGRICULTURAL IMPLEMENT.

SPECIFICATION forming part of Letters Patent No. 644,317, dated February 27, 1900.

Application filed May 6, 1899. Serial No. 715,773. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Agricultural Implements, of which the following is a specification, reference being had to the accompanying drawings.

My invention relates to agricultural implements of the class used for opening a furrow.

It consists principally of new and improved furrow-opening devices by which the soil is more perfectly overturned and pulverized and a squared furrow formed providing a clear space for the furrow-horse and a solid bearing for the caster-wheel when one is used.

It further consists in certain improvements in the construction of the frame of the machine by which change of direction of the draft of the team alters the angle of the wheels, in improved means for counteracting the side pressure of the furrow-opener and for releasing the caster-wheel when the direction of draft is changed, in an improved mounting for the furrow-opener disk by which the friction incident to its rotation is reduced to the minimum, in a construction of ball-bearings for the furrow-opener disk which permits the removal of the disk without interference with the adjustment of such bearings, and in certain other improvements which are hereinafter specifically pointed out.

That which I regard as new will be set forth in the claims.

In the accompanying drawings, Figure 1 is a side elevation of a machine embodying the improvements above indicated. Fig. 2 is a plan view of the same. Fig. 3 is a section on line 3 3 of Fig. 2. Fig. 4 is a section on line 4 4 of Fig. 2. Fig. 5 is a section on line 5 5 of Fig. 2. Fig. 6 is a side view of the parts shown in Fig. 5. Fig. 7 is a view of the upper end of the axle of the rear furrow-wheel or caster-wheel. Fig. 8 is a top view of the same. Fig. 9 is a sectional view of the furrow-opener disk and its bearing.

10 indicates a longitudinal bar or beam which constitutes the frame for the various parts of the machine. It is provided with an offset or bent portion 11 to receive the edge of the furrow-opener disk, as will be hereinafter described.

12 indicates the main-wheel axle, which extends transversely of the beam 10 and is pivotally mounted thereupon, as shown in Figs. 2, 3, and 4, the axle 12 being provided with a downwardly-extending pivot 13, arranged about centrally, which fits into a bearing in a plate 14, secured to and projecting from the beam 10, as shown in Fig. 2. The pivot 13 may be secured to the axle 12 in any suitable manner, as by clips 15 and bolts 16, as shown in Fig. 2, and the pivot is secured in its bearing by a bolt 17, which passes through it and is secured by a washer 18 and nut 19 or other suitable means. The pivot 13 also has secured to it the seat-beam-supporting bracket 20, as shown in Fig. 3. The bearing-plate 14 is preferably secured to the beam 10 by a bolt 21, as best shown in Fig. 4; but it may be otherwise secured, if desired, or it may be formed integral with the beam 10, although the latter arrangement is not preferred.

By the construction above described the axle 12 is permitted to swing in a horizontal plane, turning on the pivot 13, so as to adjust the wheels to different angular positions with reference to the beam.

22 indicates a land-wheel which is mounted upon a crank-axle 23, the upper end of which is pivoted in a bearing 24, provided at one end of the axle 12. The axle 23 may be rocked in said bearing to adjust the height of the land end of the axle 12 by means of a lever 25, connected by a connecting-rod 26 to the crank 23 at a point opposite or near the wheel-spindle. A segmental rack 27 is provided for locking the lever in its different positions of adjustment.

28 indicates a front furrow-wheel which is mounted in an inclined position upon an axle 29, arranged at the furrow end of the axle 12. The inner end 30 of the axle 29 rises in a vertical position and carries a segmental rack 31 and a lever 32, which lever is connected by a connecting-rod 33 to the adjacent end of the axle 12, so that by operating said lever the end of the axle 12 may be raised or lowered, as desired.

34 indicates a bracket consisting of a vertical bar having horizontal arms 35 36, the horizontal arm 35 being at the upper end of the bracket and the arm 36 near the lower end thereof. The lower end of the bracket is journaled in a suitable bearing formed by a clip 37, which is secured to the forward end of the beam at one side, as shown in Figs. 2 and 5.

38 indicates the tongue, which is secured to a plate 39, pivoted upon the horizontal arm 35 and arranged to swing in a vertical plane.

40 indicates a collar arranged upon the arm 35 in a fork formed in the inner end of the plate 39. The collar 40 is secured by a bolt 41 to the arm 35, so that it prevents displacement of the plate 39.

42 indicates a draft-clevis which is secured to the forward end of the beam 10, as shown in Fig. 2.

43 indicates a rear furrow-wheel or caster-wheel which is mounted upon a crank-axle 44, having a vertical spindle 45, which is journaled in a suitable bearing 46 at the rear end of the beam 10.

47 indicates a sleeve secured upon the spindle 45 to hold said spindle in place.

48 indicates a disk or plate secured at or near the upper end of the spindle 45 and provided with a depending segment 49, as shown in Fig. 1.

50 indicates a lever mounted upon the spindle 45 below and in proximity to the plate 48, which lever is adapted to engage the segment 49. Said lever is preferably curved, as shown in Fig. 2, and is provided with a connecting-rod 51, the forward end of which is connected to the arm 36 of the bracket 34 near the inner end of said arm, as shown in Fig. 2. The connecting-rod 51 is pivotally connected to the lever 50 and is made adjustable by means of a nut 52, mounted upon screw-threads upon said rod and fitted in a suitable socket in a connecting-bracket 53, as shown in Fig. 1, said bracket being connected to the lever 50 by a pivot 54.

55 indicates a collar which is secured to the spindle 45 immediately below the lever 50, so that it holds said lever in place without preventing its rotation upon the spindle.

The arrangement of these parts is such that when the machine is in operation, the draft being straight away, so that the arm 36 of the bracket 34 is substantially at right angles to the beam 10, the lever 50 will engage one edge of the segment 49, and thereby hold the caster-wheel 43 in a position slightly inclined outwardly with reference to the line of draft, thereby causing said wheel to counteract the side pressure of the furrow-opener. This action is in some respects similar to that described in my former application filed February 27, 1899, Serial No. 706,955, but differs in the fact that in my present construction there is a pulling strain upon the connecting-rod 51 instead of a pushing strain, as in the construction of my former application. When the team is directed to the right, the tongue 38 is swung in that direction, consequently swinging the bracket 34 and throwing back the lever 50 through the instrumentality of the rod 51, thereby permitting the caster-wheel to turn readily to correspond with the movement of the machine. If the team is turned in the opposite direction, the caster-wheel may swing freely in the opposite direction also. In order to adjust the wheels of the machine when the team is turned in one direction or the other, the axle 12 is connected by a connecting-rod 56 to the arm 36 of the bracket 34, as shown in Fig. 2. Obviously, therefore, the swinging of the tongue in either direction will effect a corresponding swinging of the axle 12 upon its pivot 13, carrying the wheels with it.

A further result of the construction above described is that the land-wheel and front furrow-wheel are automatically controlled and operated to resist and counteract the side pressure of the furrow-opener, inasmuch as, owing to such side pressure, the caster-wheel tends constantly to turn inward toward the land, and therefore exerts a continual backward pull on the rod 51. Such backward pull is transmitted through the arm 36 of the bracket 34 to the connecting-rod 56, and through it to the front end of the axle 12, thereby tending to turn the axle in the direction indicated by the arrow in Fig. 2, which would carry the front furrow-wheel back and the land-wheel forward and run the plow away from the land side. The parts are so adjusted that the different forces counteract one another, so that the plow is held steadily to its course.

Obviously the parts above described may be used with other styles of furrow-opening devices than those shown.

I will now describe my improved furrow-opening devices, and, by way of explanation, it may be remarked that heretofore various attempts have been made to construct a satisfactory disk furrow-opener, but so far as I am aware they have not been really successful, in view of the fact that they have not properly pulverized or overturned the soil, nor have they left the furrow in satisfactory condition. Such furrow-openers have usually consisted of a concavo-convex disk used to cut into the earth, the dirt being carried up by the rotation of the disk and discharged from it by the action of a scraper bearing against the inner face of the disk and acting simply to scrape the dirt from the disk without effecting its discharge. In practice with furrow-openers of this character the dirt accumulates at the scraper until the accumulated mass falls in a lump from it, the result being that the dirt carried up by the furrow-opener is neither overturned nor pulverized, so that the plowed field is not left in proper condition, as it is uneven, and cornstalks and other matter are not plowed under. A further objection to the use of prior disk furrow-openers has been that they do not leave the furrow in proper shape, as, owing to their circular form, the land side of the furrow is not squared, but is left concave in form, so that it does not afford a proper footing for the furrow-horse nor a solid bearing for the caster-wheel where one is used, and, besides, it is not left in suitable shape for the next cut, the result being that a field plowed with such an implement is left with longitudinal ridges which must afterward be plowed up. My improved furrow-opening devices avoid all the objections above noted, as provision is made for overturning and pulverizing the dirt carried up by the moldboard and also for squaring up the furrow, so that a square vertical bank is provided for the next cut, just as is the case with an ordinary landside-plow.

By reference to Fig. 1 it will be seen that a disk 57 is provided for cutting and throwing up the soil. Said disk is carried by the beam 10 and is set at a suitable angle thereto. It is mounted upon a suitable spindle 58, which is fitted in a bearing in a casting 59, carried at the lower end of a bracket 60, said bracket being secured to the beam 10, as shown in Fig. 1. In order to reduce the friction of the spindle 58 to the minimum, it is provided with ball-bearings, as illustrated in Fig. 9. Such bearings are constructed as follows: The casting 59 is provided at its ends with bowls 60 61, and in each of said bowls is provided a concave chilled ring or cup 62, which cups receive the balls 63. The balls at the inner end of bearing are preferably larger than those at the outer end. A bolt 64 extends through the spindle 58 and carries chilled cones 65, which coact with the cups 62 to form the ball-bearings. The inner end of the bolt 64 is screw-threaded and screws into and through the inner end of the spindle 58, as shown in Fig. 9, so that the parts of the bearing are held together, whether the disk 57 is in place or not. At the inner end of the spindle 58 is a concavo-convex plate 66, the concave face of which is adapted to receive the disk 57, as shown, the convex face having a flanged recess 67, adapted to receive the inner edge of the casting 59, forming a closed case for the inner portion of the ball-bearing. The disk 57 is secured in contact with the plate 66 by a nut 68, screwed upon the inner end of the bolt 64 and bearing against a washer 69. To remove the disk, it is only necessary to remove the nut 68 and washer, the ball-bearing being undisturbed.

In addition to the disk 57 for cutting and carrying up the dirt the furrow-opener comprises means for removing the dirt from the disk and overturning and discharging it in a more or less pulverized condition, such means, in the best form of the invention, consisting of a moldboard or moldboard-shaped plate extending from near the axis of the disk to the periphery thereof and arranged at an angle thereto, so that as the disk rotates the dirt is removed from its inner face by the moldboard and is directed out upon the surface of the moldboard and overturned, owing to the curvature thereof, being discharged beyond the edge of the disk. Furthermore, as the operation of removing the dirt from the disk is constant, the dirt passes regularly in a stream over the moldboard and does not accumulate in a mass before being discharged. Consequently it falls in pulverized form instead of in lumps, as is the case where an ordinary scraper is employed to remove it from the disk.

In the drawings, 70 indicates the moldboard, which is best arranged with its lower edge in close proximity to the disk and in substantially a horizontal position, extending radially from the axis of the disk to its edge. The moldboard is supported by a bracket 71, adjustably secured by a clamp 72 to the bracket 60 or other suitable support. The moldboard is adjustably secured to the bracket 71 by means of an adjustable rod or arm 73, so that various adjustments of its position may be made.

The furrow-opening devices further comprise a plow 74, which is arranged back of the disk 57 in position to cut out the rounded portion of the furrow, squaring it up, and presenting a vertical edge for the next cut, as well as leaving a solid flat furrow. It also presents a proper bearing for the caster-wheel, as hereinbefore suggested. The plow further serves to give suction to the disk—that is to say, it serves to hold the disk down in the ground while in operation, and thereby increases its efficiency. In the construction illustrated the plow 74 is carried by a standard 75, which is secured to the beam 10 at a suitable point back of the disk 57, so that the landside of the plow lies in line substantially with the inner or land side of the furrow cut by the disk.

It will be understood that while I have described in detail the construction of the implement illustrated in the drawings various modifications may be made without departing from my invention, and I therefore do not limit myself to the specific arrangements shown and described.

That which I claim as my invention, and desire to secure by Letters Patent, is—

1. A plow having a furrow-opener-supporting frame or beam, land and furrow wheels supporting said frame and angularly adjustable with reference to said supporting-frame to change the line of travel of the plow, and means for automatically controlling the angular position of said wheels so as to counteract to a greater or less extent the side pressure upon the furrow-opener, substantially as described.

2. A plow having a furrow-opener-supporting frame or beam, a furrow-opener carried thereby, a wheel-axle extending transversely of said frame and arranged to swing about a vertical pivot, land and furrow wheels mounted upon said axle, and means operated by side pressure upon the furrow-opener for adjusting the angular position of said axle so as to cause the machine to run away from the land side and counteract to a greater or less extent the pressure upon the furrow-opener, substantially as described.

3. A plow having a furrow-opener support or beam, a furrow-opener carried thereby, an axle extending transversely of said beam and arranged to swing about a vertical pivot, land and furrow wheels mounted thereupon, a caster-wheel back of the furrow-opener and arranged to swing about a substantially-vertical axis, said caster-wheel being set normally so as to run out from the land side, and means operated by the swinging of the caster-wheel upon its vertical axis for adjusting the land and furrow wheels, substantially as and for the purpose specified.

4. A plow having a furrow-opener support or beam, a furrow-opener carried thereby, an axle extending transversely of said beam and arranged to swing about a vertical pivot, land and furrow wheels carried by said axle, and a controlling device arranged back of the furrow-opener, said controlling device being operated by the side pressure upon the furrow-opener to control the angular position of the land and furrow wheel axle with reference to the furrow-opener beam, substantially as and for the purpose specified.

5. In a plow, the combination of a furrow-opener support or beam, a furrow-opener carried thereby, an axle extending transversely thereof and pivoted to swing about a vertical axis, land and furrow wheels carried by said axle, a caster-wheel at the rear of the furrow-opener, said caster-wheel being arranged to swing about a substantially-vertical axis and having a laterally-projecting lever, a horizontal arm pivoted near the front end of the beam, a connecting device connecting said lever and arm, and a connecting-rod connecting said arm with the furrow-wheel axle at the furrow-wheel side of the plow, substantially as described.

6. In a plow, the combination of a furrow-opener support or beam, a furrow-opener carried thereby, an axle extending transversely thereof and pivoted to swing about a vertical axis, land and furrow wheels carried by said axle, a caster-wheel at the rear of the furrow-opener, said caster-wheel being arranged to swing about a substantially-vertical axis and having a laterally-projecting lever, a horizontal arm pivoted near the front end of the beam, a connecting-rod connecting said lever and arm, a connecting-rod connecting said arm with the furrow-wheel axle at the furrow-wheel side of the plow, and a tongue connected with said arm, substantially as described.

7. The combination of a machine-frame, a caster-wheel adapted to swing about a substantially-vertical axis, a laterally-extending lever loosely connected with said caster-wheel, means limiting the independent movement of said lever and caster-wheel when in operative position, a substantially-horizontal arm or crank, and a tie-rod for connecting said lever and arm, substantially as described.

8. In an agricultural implement, the combination of a machine-frame, a caster-wheel pivoted to swing about a substantially-vertical axis, and having a laterally-extending arm, means limiting the independent movement of said arm and caster-wheel, and a tie-rod or connecting device which operates normally to hold said caster-wheel in operative position and permits angular adjustment thereof when the line of travel of the implement is altered, substantially as described.

9. In an agricultural implement, the combination of a machine-frame, a caster-wheel pivoted to swing about a substantially-vertical axis, a furrow-opener, an arm connected with said caster-wheel and extending laterally toward the landside of the machine, means connected to said arm for automatically preventing backward movement thereof except when the line of travel is altered, and connecting mechanism between said arm and the caster-wheel for limiting their independent movement, substantially as described.

10. An agricultural implement consisting of suitable supporting devices, and a furrow-opener comprising a cutting-disk and a moldboard coacting therewith to remove the dirt therefrom, the lower edge of said moldboard being in close proximity to the disk-surface and extending substantially radially in a substantially-horizontal position from the axis of the disk to or near the outer edge thereof, the upper portion of said moldboard being curved outward, substantially as described.

11. An agricultural implement consisting of suitable supporting devices, and a furrow-opener comprising a cutting-disk and plowing mechanism arranged back of said disk acting to square the furrow, substantially as and for the purpose specified.

12. In a plow, the combination with furrow-opener-supporting devices, of a disk furrow-opener, and a landside-plow arranged back of said disk and arranged to square the furrow, substantially as and for the purpose specified.

13. The combination with a furrow-opener-supporting device, of a rotary spindle carried thereby, a ball-bearing therefor, means holding the parts of said bearing together, independently of the disk, and means for attaching a disk to one end of said spindle, substantially as described.

14. The combination with supporting devices, of a sleeve, a spindle in said sleeve, balls supporting said spindle in said sleeve and forming bearings therefor, said spindle having a face at one end to form a seat for a furrow-opener disk, a bolt uniting the parts of the bearing, and means for detachably securing a disk to said spindle, substantially as described.

15. The combination with supporting devices, of a sleeve 59 having concave recesses at its ends, a spindle fitted in said sleeve, cones carried by said spindle, balls between said cones and the ends of the sleeve, a bolt extending through said spindle for holding the parts together, said bolt having a screw-threaded engagement with the spindle, a disk mounted upon the end of said bolt, and a nut upon the end of said bolt securing said disk thereupon, substantially as described.

16. A bearing for the disks of disk-machines consisting of a sleeve having concave recesses at its ends, chilled rings in said recesses, said rings having concave bearing-faces forming cups to receive ball-bearings, a spindle extending through said sleeve, cones at the inner and outer ends of said spindle, a bolt extending through said spindle and detachably connected thereto, and a plate at the inner end of said spindle adapted to form a seat for the disk, substantially as described.

WILLIAM T. M. BRUNNEMER.

Witnesses:
JOHN L. JACKSON,
ALBERT H. ADAMS.